United States Patent [19]

Rousseau et al.

[11] 3,837,855

[45] Sept. 24, 1974

[54] PATTERN DELINEATION METHOD AND PRODUCT SO PRODUCED

[75] Inventors: Denis Lawrence Rousseau; William Robert Sinclair, both of Summit, N.J.

[73] Assignee: Bell Telephone Laboratories Incorporated, Murray Hill, N.J.

[22] Filed: May 9, 1973

[21] Appl. No.: 358,727

[52] U.S. Cl. ............... 96/35, 96/38.3, 204/157.1 R, 204/157.1 H, 148/6, 96/92

[51] Int. Cl. ............................................. G03c 5/00

[58] Field of Search ............. 204/157.1 R, 157.1 H; 96/35, 36, 38.3; 148/6

[56] References Cited

UNITED STATES PATENTS

| | | | |
|---|---|---|---|
| 3,445,356 | 5/1969 | Beutner et al. | 204/157.1 R |
| 3,637,379 | 1/1972 | Hallman et al. | 204/157.1 R |
| 3,681,227 | 8/1972 | Szupillo | 96/38.3 |
| 3,695,908 | 10/1972 | Szupillo | 96/38.3 |

*Primary Examiner*—Ronald H. Smith
*Assistant Examiner*—Edward C. Kimlin
*Attorney, Agent, or Firm*—G. S. Indig

[57] ABSTRACT

A process for the fabrication of a supported iron oxide pattern involves electromagnetic wave irradiation of a blank. The blank consists of a layer of iron oxide which is soluble in, for example, an acid medium. Irradiation results in insolubilization so that delineation is accomplished by immersing the processed blank in a suitable solvent.

11 Claims, 3 Drawing Figures

PATTERN DELINEATION METHOD AND PRODUCT SO PRODUCED

BACKGROUND OF THE INVENTION

1. Field of the Invention

The invention is concerned with the fabrication of supported films of primary interest for use as masks or resists in the fabrication of printed circuitry.

2. Description of the Prior Art

Recently developed technology concerned with the fabrication of printed circuits involves the use of supported films of iron oxide. Patterns formed of such films are already in extensive pilot use as hard copy photomasks for defining regions of photosensitive resist materials to be irradiated by contact or projection printing. Some aspects of this development are described in 120, *Journal of the Electrochemical Soc.*, page 545, (April 1973). Other relevant references include: 118, *J. Electrochem. Soc.*, 341 (1971), and 118, *J. Electrochem. Soc.*, 776 (1971).

Iron oxide films, properly constituted, are preferable to earlier used materials, such as conventional photographic emulsions, simply because of their improved hardness and abrasion resistance. This consideration alone, which results in substantially increased life, is sufficient to justify their use.

A special advantage of such iron oxide arises from its relatively high transparency in regions of the visible spectrum. Such material is sufficiently opaque to be usable with the relatively short wavelength ultra-violet radiation necessary for defining conventional photoresist materials. Transparency in the visible permits use in the "see through" mask, thereby permitting registration with circuit details generated during preceding delineation steps. This is of particular significance for the very small high resolution circuits which are now evolving, and workers in the field generally consider the iron oxide pattern a satisfactory procedure.

As described in the references cited, fabrication of an iron oxide pattern, whether in the form of a mask or otherwise, depends upon the soluble nature of the film. This soluble nature, generally traced to the amorphous nature of the film as determined by X-ray diffraction, is conveniently defined as sufficient to result in removal of a 1 $\mu$m thick film in 6N HCl in 1 hour at room temperature. This solubility permits delineation by conventional photoresist methods which entail depositing a layer of photoresist, either positive or negative, and selectively irradiating portions to be removed or retained in a subsequent dissolution step. Delineation is then accomplished by immersion, for example, in suitable acidic media.

SUMMARY OF THE INVENTION

In accordance with the present invention, pattern delineation is accomplished by selective insolubilization of the otherwise soluble iron oxide film, with pattern formation resulting by removal of soluble portions by wetting the entire film in an appropriate solvent. The fundamental teaching of the invention involves the finding that insolubilization results from electromagnetic wave irradiation of the film. On the basis of experimental observations, it is postulated that the mechanism involves simple heating. Accordingly, it is found that any radiation which is absorbed in the soluble film is satisfactory for the inventive purposes. Radiation within the wavelength range from the infrared through the visible spectrum, the ultraviolet spectrum, and including X-ray and gamma-ray, are suitable.

A preferred embodiment which avoids the use of ancillary masks and resists in the delineation process and which, therefore, may result in improved resolution involves a programmed focused beam, as a laser beam.

DETAILED DESCRIPTION

1. Nature of the Unprocessed Film

Figure 1:
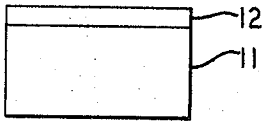
FIG. 1 is a front elevational view of an unprocessed blank consisting of a soluble iron oxide layer on a substrate.
Figure 2:
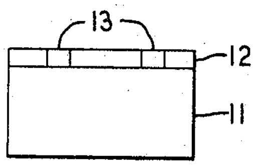
FIG. 2 is a front elevational view of the structure shown in FIG. 1 after selective irradiation in accordance with the invention.
Figure 3:
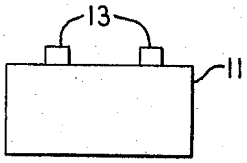
FIG. 3 is a front elevational view in cross section of the structure shown in FIGS. 1 and 2 after removal of the unirradiated portions of the iron oxide layer.

The inventive process is dependent upon insolubilization of an iron oxide film, such as, film 12 of FIG. 1. It is, therefore, an implicit requirement of the invention that the film before processing evidence a required degree of solubility. This implicit requirement applies regardless of the manner in which the oxide film is produced.

Suitable procedures for preparation of oxide films are described in the references noted in the prior art section. Soluble films have been prepared by chemical vapor deposition from iron-containing compounds, such as, iron carbonyl; and, in fact, blanks prepared by this procedure are now commercially available. Suitable films have also been prepared by sputtering, for example, in an atmosphere containing carbon monoxide. A recently developed procedure is described in copending application Ser. No. 358,728 filed May 9, 1973 (L. F. Thompson Case 4). This procedure involves the oxidative breakdown of polyvinyl ferrocene or similar material which is ordinarily applied to the substrate in the form of a solution.

It is common practice to describe the soluble oxide film as "$Fe_2O_3$." There is, however, experimental basis indicating that the film is of somewhat more complex composition, and, in fact, that it may vary to some degree depending upon the procedure used for its preparation. For example, it has been noted that, under certain circumstances, the oxidized film contains considerable amounts of carbon. Under usual circumstances, this carbon is present in the compound $Fe(CO_3)_2$. Such inclusion is common where films are prepared from carbonyl or by low temperature oxidation of polyvinyl ferrocene (350° C or less). Some workers have even postulated that the carbonate content of the film contributes to its solubility; and in substantiation, it has been observed that $CO_2$ is sometimes liberated during the insolubilization process. However, soluble oxide films have been prepared under circumstances where carbonate content is not detectably present. For example, the same oxidation procedure for preparation of the film polyvinyl ferrocene at temperatures above about 380° C (but below some maximum of approximately 420° C) results in suitably soluble oxide films with little or no evidence of carbonate content. Processing of soluble films, however prepared, at temperatures of 380° C or above may result in liberation of $CO_2$ without rendering the films insoluble.

Regardless of the manner in which the oxide film is produced, it is considered proper to characterize it as "amorphous." It has been found that neither X-ray nor electron beam diffraction analysis reveals long-range ordering over distances of 50 Angstrom units or greater. It has been uniformly found that films characterized as amorphous within these indicated limits are sufficiently soluble to permit operation of the inventive process.

The essential requirement of solubility is here defined as disappearance of a film of a thickness of 1$\mu$m in a period of 1 hour or less when wetted by aqueous 6N HCl when maintained at room temperature.

This particular reagent, while conveniently utilized as a standard for the purpose of this definition and while quite suitable for practice of the invention, is merely exemplary of a large class of appropriate etching media. In fact, irradiation of oxide films prepared in accordance with the invention are rendered at least an order of magnitude less soluble in virtually all etchants for the unprocessed film. Film thickness is a parameter which may be varied to suit the particular requirements of both pattern delineation and ultimate use. The invention does not depend upon film thickness—any feasible thickness may be insolubilized by irradiation to result in selective retention in an appropriate etchant. While there are in consequence no strict limits on thickness, film continuity is assured by thicknesses of the order of 500 Angstrom units or even less and thicknesses of approximately 2$\mu$m are sufficient for presently contemplated needs. These limits threfore prescribe a probable working range.

2. Irradiated Material

Irradiated film or portions are generally in whole or in part characterized by the structure of $\alpha$ $Fe_2O_3$. Under certain circumstances, where conditions are such that there is significant loss of oxygen, some part of the material may be converted to $Fe_3O_4$. For example, such loss may result in irradiated films containing as much as 50 percent by weight $Fe_3O_4$. The essence of the invention does not reside in the particular chemical composition or crystallographic nature of the irradiated film but rather in the observation that irradiation, when carried out under the conditions noted, results in sufficient differentiation in terms of solubility as compared to unirradiated portions to permit pattern delineation by immersion or other wetting of the entire film.

A significant advantage of the prior art masks using iron oxide is sufficient transparency of the film for visible light to permit registration with any underlying detail. This characteristic is particularly useful for very small high resolution circuits prepared by contact printing. In projection printing, the "see through" characteristic may not be so important, and automation even of contact printing processes may ultimately result in less emphasis on transparency. Iron oxide is a valuable material both for mask and resist use at least in part because of its excellent physical characteristics, e.g., abrasion resistance.

Whatever the value, crystallized material resulting from irradiation in accordance with the invention, while of somewhat altered absorption characteristics in the visible spectrum, continues to be sufficiently transparent to permit use as a see through mask.

3. Substrate

A detailed discussion of substrate requirements is not appropriate to this description. Substrates are generally selected on the basis of intended use and this, in turn, requires that they be capable of withstanding whatever conditions are encountered during processing. For see-through mask use, substrate material must, of course, be sufficiently transparent to permit visual alignment. Mask use generally requires tranparency sufficient to pass whatever radiation is to be passed. (For usual photoresists, this requires tranparency in the near ultraviolet spectrum.) Exemplary materials for see-through mask use are fused silica, sapphire, and mixed oxide glasses, such as, borosilicates, etc. Where the oxide film is used as a resist, the substrate is, of course, the article being processed. This may constitute a simple or composite surface including such diverse materials as silicon, silica tantalum oxide or nitride and a variety of metals, such as titanium, platinum, gold, tantalum, etc.

4. Processing

Insolubilization, it has been indicated, is attendant upon irradiation which results in local crystallization of the oxide film. It is postulated that the crystallization is brought about as a direct consequence of local heating with film temperatures in the portion being irradiated attaining a level at least about 420° C. This postulate is supported by a mass of experimental information including bulk heating experiments in which, for example, such temperatures were found to produce insolubilization. Spectral changes brought about by bulk heating have been found to be of the same general form as that produced in the irradiated film; and it has been found that the form of the absorption spectrum, as well as the actual peak values, are similar.

It is fortunate the unprocessed film evidences sufficient absorption over a very broad spectrum to result in attainment of conditions required for insolubilization using available light sources. Insolubilization has resulted from irradiation at wavelengths from the far infrared to the short wavelength end of the visible spectrum. There is sufficient absorption to permit insolubilization even outside this range into X-ray and gamma-ray wavelengths.

Regardless of the wavelength of electromagnetic irradiation used, there should be sufficient penetration to assure insolubilization in the critical region of the film at the film-substrate interface. Experimentally, as light intensity is reduced under otherwise similar conditions, there is a point reached at which insolubilization occurs only in film regions below the free surface. Further reduction results in further thinning of the insolubilized film until at very low intensity only the region at the interface is insolubilized.

In general, it is undesirable to utilize light intensity or integrated exposure significantly exceeding that required to insolubilize the entire thickness of the film. Exceeding this amount greatly may result in some loss in resolution due to heat conduction within the film and/or reflection at the interface. Maximum tolerable intensity or integrated exposure is determined on the basis of evaporative loss. Above some level, surface material is boiled off, thereby again resulting in a thinning of the insolubilized film which is retained after development. While some thinning may under some circumstances be tolerable, preferred processing will generally utilize integrated work levels insufficient to result in appreciable evaporative loss.

It is apparent that power level is dependent upon a variety of parameters, for example, the absorption of the film for the particular wavelength of radiation utilized, ambient temperature, thermoconductivity of film and substrate, reflectivity of substrate, area being irradiated at any given time, etc. Invention is considered to inhere in the observation that insolubilization resulting in the characteristics noted occurs by virtue of electromagnetic wave irradiation. Maximum power level for any given set of operating conditions is easily determined. So, for example, irradiation level may be varied gradually for any given set of conditions. A preferred maximum level coincides with the level which results in significant evaporation loss. Minimum level corresponds with that just adequate to result in retention of the entire thickness of film after irradiation and etching. For example, it has been demonstrated that power levels may range upwards for 1 watt/mm$^2$ to $10^5$ watts/mm$^2$ with effective exposure time whether static or from a moving beam ranging from 50 nanoseconds to 5 minutes.

To a greater extent where the film is to be used as a resist, but where it is to be used as a mask as well, greatest resolution results where pattern delineation is brought about by direct programmed beam. The ultimate limitation on any mask process results from the spreading due to diffraction and other edge losses in the mask. Where the iron oxide pattern is produced by a mask process, such a limit is set by the mask used at this stage. Where the iron oxide film, itself, serves as a mask rather than as a direct resist, a limit due to the same mechanism is set at this stage. In general, edge losses introduced by the iron oxide pattern used as a mask are small relative to some other mask materials due to feasibility of use of thin films; this, in turn, is due in part to the excellent contrast afforded by the film at short wavelengths. The ability to deposit and process continuous films, for example, to 200 Angstrom units or less, depending on the deposition technique, suggests less edge loss than for emulsion films, which are usually thicker.

Films processed in accordance with the invention have sufficient transparency at least at some wavelength in the visible spectrum to permit see-through mask use. The actual form of the spectrum of the soluble film has been only insignificantly changed during processing. Films however produced, e.g., by oxidative breakdown of polyvinyl ferrocene or chemical vapor deposition continue to show their relatively gradual decrease in transparency in the direction of short wavelength in the visible spectrum. All films processed in accordance with the invention are sufficiently transparent to permit visible alignment under feasible commercial fabrication conditions.

Actual development of the processed film, whether delineated by a programmed beam or by use of a mask, is accomplished in the manner set forth in, for example, 120, *Journal of the Electrochemical Society*, 545 (April 1973). Soluble iron oxide has been defined in this description in terms of 6N HCl. Insolubilization is sufficient to render te development process non-critical. Periods many times greater than that required to remove soluble films in a variety of etching media result in little, if any, perceptible loss of insolubilized material. Development may be carried out at room temperature although temperature may be varied to meet any other processing demands.

5. Examples

A. The blank was a 3,000 Angstrom units thick oxidized iron layer on glass produced by thermal decomposition of iron pentacarbonyl. Pattern delineation was by an argon ion laser beam operating at 5,145 Angstrom units. Spot size was focused to a diameter of approximately 3$\mu$m. Power density was approximately $10^5$watts/mm$^2$. Scan rate was approximately 2,000 cm/sec. Development (about 3 minutes in 6N HCl at room temperature) resulted in a pattern, lines of which were about 1$\mu$m wide.

B. The soluble oxide blank was produced by oxidative breakdown of polyvinyl ferrocene having an average molecular weight of about 80,000 mv. The oxide thickness of about 2,000 Angstrom units resulted from the processing of a polymer precursor film applied in benzene solution by spinning. Pattern delineation utilized the source of Example A. Beam diameter was approximately 700$\mu$m with a power density of about 20 watts/mm$^2$. Exposure time was about 15 seconds. Development by etching was under the same conditions as in Example A. This experiment, conducted to establish feasibility of operating at low power level, resulted in an insolubilized spot of about 400$\mu$m in diameter.

C. A procedure similar to that in Example B was followed, however utilizing a 6,943 Angstrom units ruby laser operating at a power level of about 2 kilowatts/mm$^2$ delivered in a 2 msec interval. Insoluble spots 3 mm in diameter were formed.

D. A procedure similar to that in Example B was followed again, however utilizing a 10.6$\mu$m $CO_2$ laser beam repeatedly pulsed at a rate of 100 pulses per sec for an exposure duration of 1 second. Results were similar to those set forth in Example C.

What is claimed is:

1. Procedure for the fabrication of a substrate supported pattern delineated film of a composition comprising oxidized iron in accordance with which portions of a continuous film comprising oxidized iron are removed by dissolution in a solvent, said film before pattern delineation being sufficiently soluble such that a film thickness of 1 micrometer is removed by dissolution in an aqueous solution of 6N HCl in an hour at room temperature, characterized in that the said processed film is pattern delineated by selective irradiation of portions of such film by electromagnetic wave energy of a power level inadequate to cause loss of substantial amount of the irradiated portions of the said film by evaporation but of sufficient power level to render such irradiated portions relatively insoluble, with the portions irradiated corresponding with the desired pattern delineation, and in that selective removal is accomplished by wetting the entire film with a solvent so as to remove unirradiated film thereby retaining the desired pattern delineated film.

2. Procedure of claim 1 in which the pattern delineated portions are defined by the apertured part of a shadow mask.

3. Procedure of claim 2 in which the electromagnetic wave energy simultaneously is incident upon substantially the entirety of the said shadow mask.

4. Procedure of claim 1 in which the electromagnetic wave energy is substantially collimated.

5. Procedure of claim 4 in which the substantially collimated electromagnetic wave energy is caused to scan successive portions of the region of the film corresponding with the desired pattern 6. Procedure of claim 5 in which the amplitude of the said wave energy is sharply decreased at intervals with decrease corresponding with the limits of the desired pattern.

7. Procedure of claim 1 in which the said electromagnetic wave energy is of a wavelength within the infrared and visible spectra.

8. Procedure of claim 7 in which the said wave energy is of a maximum wavelength of approximately 5,600 Angstrom units.

9. Procedure in accordance with claim 8 in which the said wave energy is partially focused and has a spot size within the range from 1 $\mu m^2$ to several square millimeters, exposure or any part of the desired pattern integrating to a time within the range of from 50 nanoseconds to 5 minutes in which the power density in the spot is at least 1 watt/$mm^2$.

10. Procedure in accordance with claim 9 in which said wave energy is essentially focused wherein said energy is scanned at a speed within the range of at least 0.1 centimeter per second and in which the power density of the said wave energy is at least $3 \times 10^2$ watts/$mm^2$.

11. Procedure in accordance with claim 10 in which the scanning speed is within the range of from 0.1 to 2,000 centimeters per second and in which the power density is within the range of $3 \times 10^2$ watts/$mm^2$ to $10^5$ watts/$mm^2$ .

* * * * *

UNITED STATES PATENT OFFICE

CERTIFICATE OF CORRECTION

PATENT NO. : 3,837,855

DATED : September 24, 1974

INVENTOR(S) : Denis L. Rousseau and William R. Sinclair

It is certified that error appears in the above-identified patent and that said Letters Patent are hereby corrected as shown below:

Column 2, line 56, "$350^o$" should read --$380^o$--.

Signed and Sealed this

*sixteenth* Day of *September 1975*

[SEAL]

*Attest:*

RUTH C. MASON
*Attesting Officer*

C. MARSHALL DANN
*Commissioner of Patents and Trademarks*